United States Patent

[11] 3,580,003

| [72] | Inventor | Joseph P. Dolan<br>Chicago, Ill. |
|---|---|---|
| [21] | Appl. No. | 752,710 |
| [22] | Filed | Aug. 14, 1968 |
| [45] | Patented | May 25, 1971 |
| [73] | Assignee | The Institute of Gas Technology<br>Chicago, Ill. |

[54] COOLING APPARATUS AND PROCESS FOR HEAT-ACTUATED COMPRESSORS
18 Claims, 9 Drawing Figs.

[52] U.S. Cl........................................................ 62/115,
62/498, 62/119, 62/116
[51] Int. Cl........................................................ F25b 1/00
[50] Field of Search........................................ 62/117, 6,
114, 122, 498, 141, 148, 149, 238, 116, 95, 96, 98,
99, 119; 60/39, 66

[56] References Cited
UNITED STATES PATENTS

| 3,143,592 | 8/1964 | August.................... | 62/119X |
| 3,226,941 | 1/1966 | Snelling................... | 62/119X |
| 3,259,176 | 7/1966 | Rice et al.................. | 62/238X |
| 3,400,555 | 9/1968 | Granryd................... | 62/498X |
| 3,401,530 | 9/1968 | Meckler.................... | 62/238 |
| 3,413,815 | 12/1968 | Granryd................... | 62/498X |

Primary Examiner—William J. Wye
Attorney—Alexander & Speckman

ABSTRACT: Apparatus and process for cooling heat-actuated engines or compressors by use of boiling refrigerant, especially suitable for use with heat-actuated regenerative compressor systems used in conjunction with a condenser-expansion-compression cooling cycle.

Patented May 25, 1971
3,580,003
2 Sheets-Sheet 1
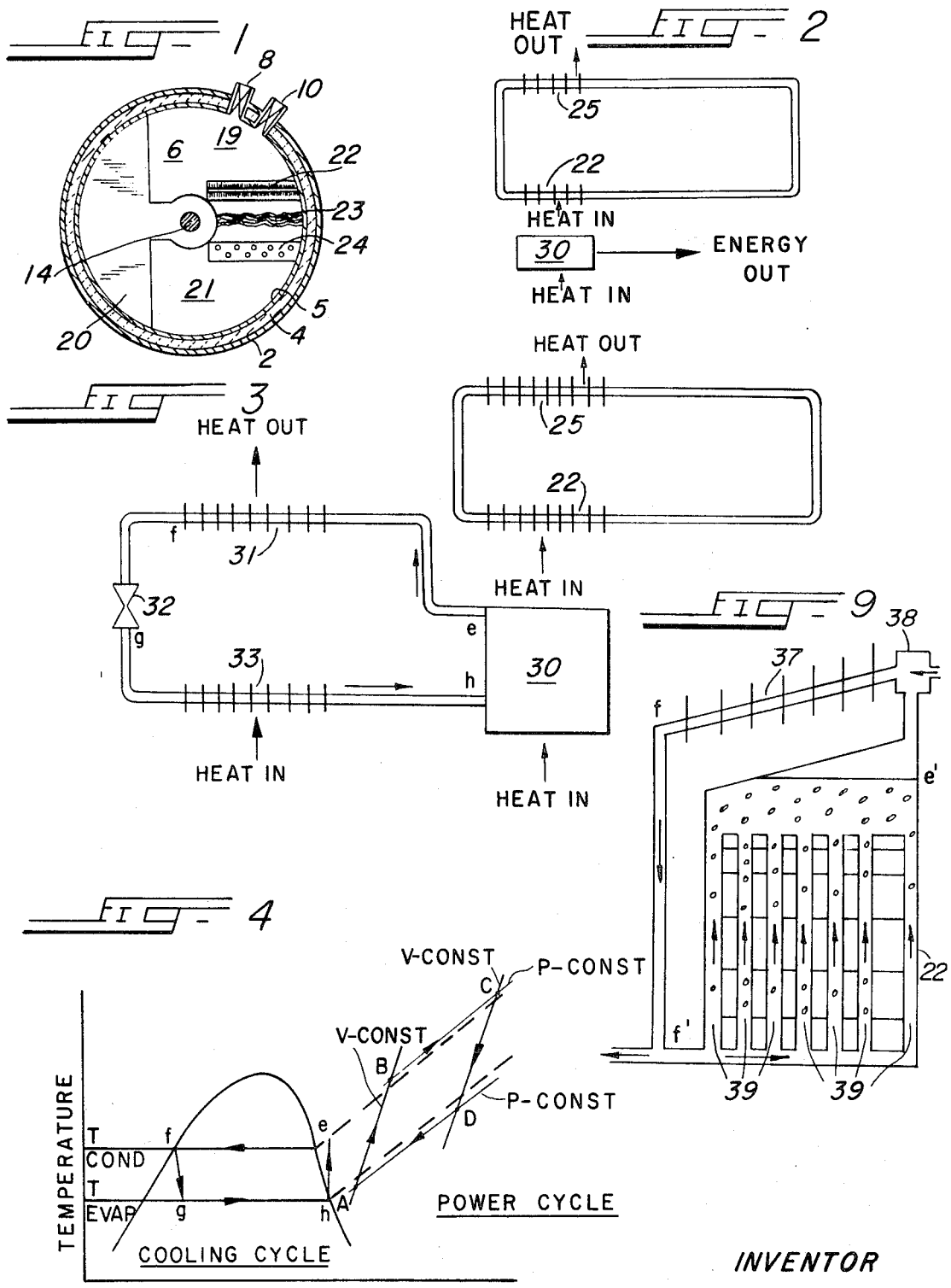
INVENTOR
JOSEPH P. DOLAN
BY Alexander & Speckman
ATTYS Patented May 25, 1971 3,580,003
2 Sheets-Sheet 2
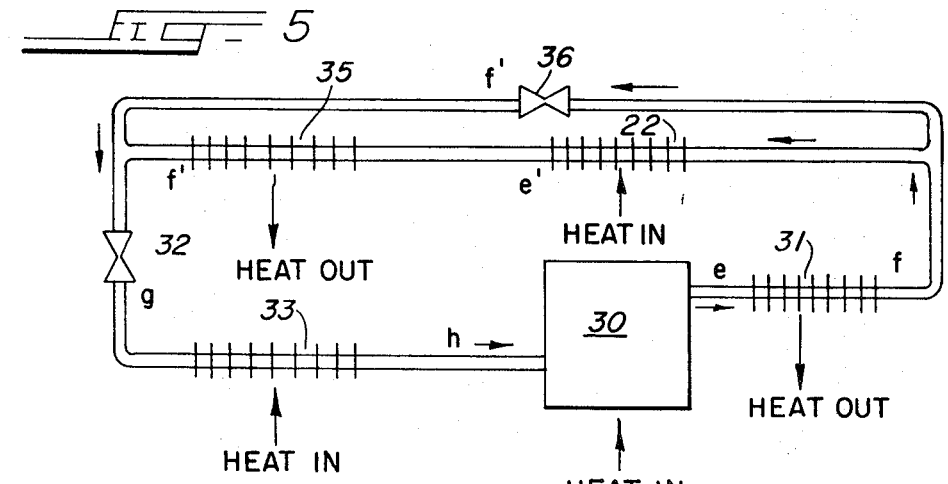
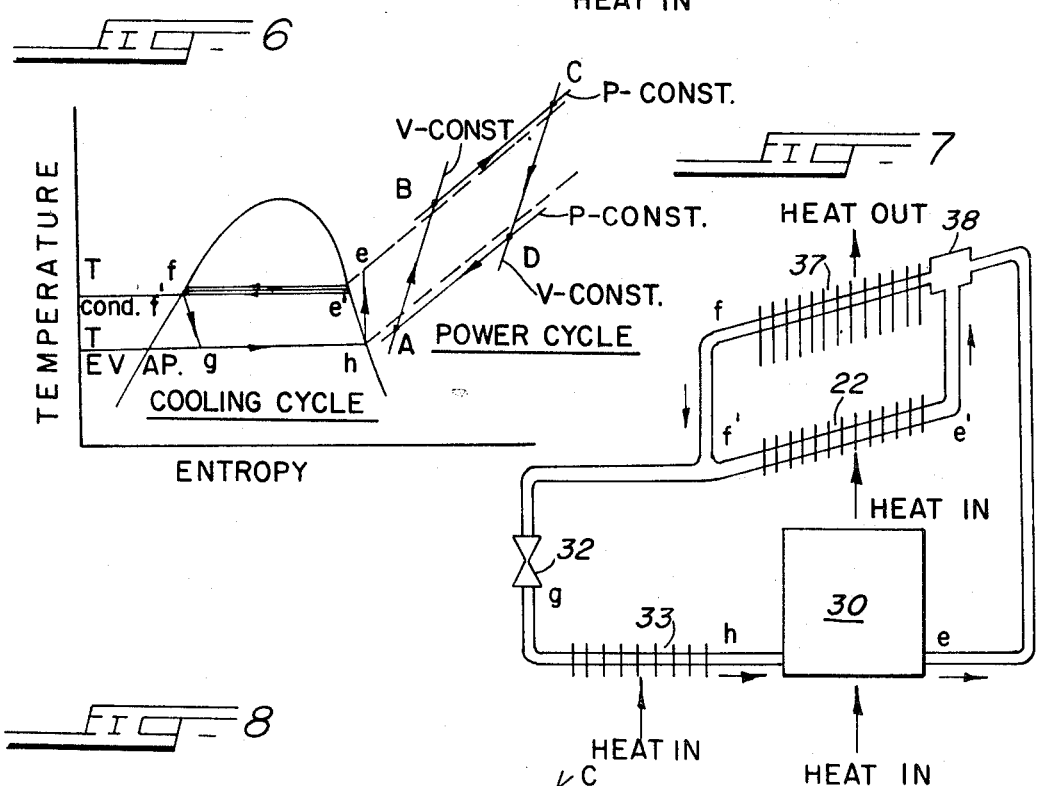
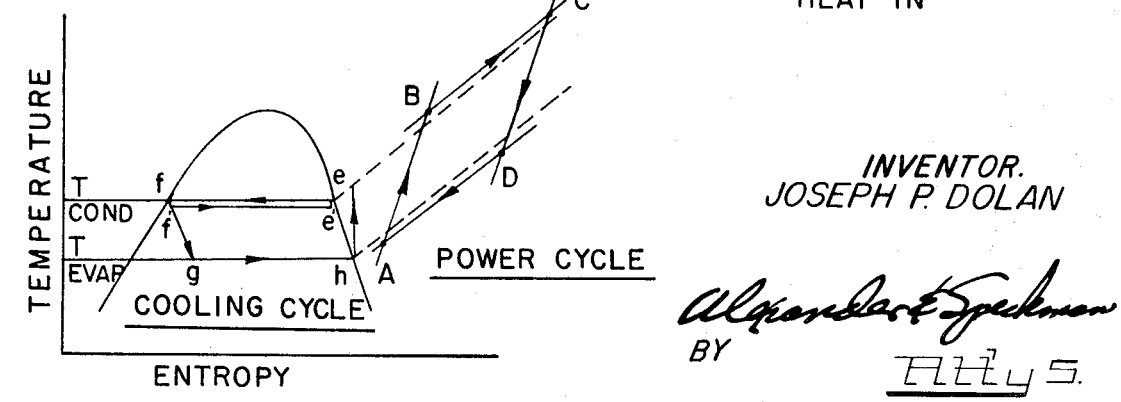
INVENTOR.
JOSEPH P. DOLAN

COOLING APPARATUS AND PROCESS FOR HEAT-ACTUATED COMPRESSORS

BACKGROUND OF THE INVENTION

Heretofore heat-actuated engines and compressor systems, such as Stirling engines, heat-actuated regenerative compressors, and the like, have principally utilized water or air to circulate through the heat transfer portions for cooling of the units. Heat-actuated regenerative compressors, such as disclosed in copending Pat. application Ser. No. 698,857, "Heat-actuated Regenerative Compressor System" filed Jan. 18, 1968, now U.S. Pat. No. 3,474,641, circulated through the internal thermal exchangers in a closed cooling loop at atmospheric or slightly greater pressure wherein the water is cooled by external cooling means. Use of either air or such water-type cooling means is disadvantageous due to large surfaces necessary to obtain adequate thermal exchange.

Water cooling at about atmospheric pressure becomes especially disadvantageous due to large volumes of water required and the accessory mechanisms such as large cooling towers to permit a closed cycle system, such as is generally required for water conservation. Further, the bulkiness of such cooling towers for water cooling systems renders it impractical to produce relatively small heat-actuated regenerative compressor air conditioning systems satisfactory for home or small commercial applications. Water further presents corrosion problems frequently encountered at high temperatures and the necessity of circulation at very high velocities thereby reducing the overall efficiency of heat-actuated compressor due to the high expenditure of pumping energy. Further, in heat-actuated regenerative compressors, such as have been described in copending applications Ser. No. 547,040, "Heat-Actuated Regenerative Compressor for Refrigerating Systems" filed May 2, 1966, now U.S. Pat. No. 3,413,815, and Ser. No. 698,857, now U.S. Pat. No. 3,474,641, identified above, having cooling means for the working gas of the compressor within the active volume of the compressor, efficiency is greatly reduced by the necessity of large physical size of such thermal exchangers within the active volume of a heat-actuated compressor.

DESCRIPTION OF THE INVENTION

My invention comprises a novel configuration of components providing high efficiency boiling refrigerant cooling for any heat-actuated compressor system, including heat-actuated engines. Further, my invention comprises a novel combination of a boiling refrigerant cooled heat-actuated compressor and a condenser-expansion-evaporation compression cooling cycle. One embodiment of my invention comprises a novel cooling system wherein the external air cooling and cooling for the heat-actuated compressor is a single boiling refrigerant system. Still further my invention comprises a novel cooling system wherein the single boiling refrigerant of the external cooling system and the compressor cooling system is also the working gas of a heat-actuated regenerative compressor driving the overall cooling system.

It is an object of my invention to provide an efficient boiling refrigerant cooling system for a heat-actuated compressor thereby obtaining a higher overall coefficient of performance.

It is a further object of my invention to provide a cooling system comprising a heat-actuated regenerative compressor having a mechanical energy output driving a refrigerant through a condenser-expansion-compression cooling cycle and a separate closed loop boiling refrigerant cooling system for the heat-actuated regenerative compressor.

It is still another object of my invention to provide a novel thermal system comprising a heat-actuated regenerative compressor wherein the thermal-energy output of the heat-actuated regenerative compressor is used directly in a condenser-expansion-compression cooling cycle or a heat pump and wherein the working gas of the heat-actuated regenerative compressor is cooled by a separate closed boiling refrigerant cooling system.

It is still another object of my invention to provide a single boiling refrigerant cooling system comprising a heat-actuated regenerative compressor wherein the same boiling refrigerant is used in the connected system cooling both the heat-actuated regenerative compressor cooler and the condenser-evaporation-compression cooling cycle for exterior cooling.

These and other important objects of the invention will become apparent from the following description taken in conjunction with the drawings illustrating preferred embodiments wherein:

FIG. 1 is a plan view, in cross section, of a heat-actuated regenerative compressor;

FIG. 2 is a schematic diagram of a heat-actuated compressor with a separate boiling refrigerant cooling system according to one embodiment of this invention;

FIG. 3 is a schematic diagram of the compressor system shown in FIG. 2 powering an external atmosphere cooling system;

FIG. 4 is a graph illustrating the thermal-energy properties of the schematic system shown in FIG. 3;

FIG. 5 is a schematic diagram of a cooling apparatus including a heat-actuated compressor in conjunction with a monorefrigerant split-flow cooling system for the compressor cooling and providing for exterior environment cooling, according to one embodiment of this invention;

FIG. 6 is a graph illustrating the thermal-energy property of the cooling apparatus shown in FIG. 5;

FIG. 7 is a schematic diagram of a cooling apparatus utilizing a monorefrigerant cooling system for both the heat-actuated compressor and exterior cooling using a recycle loop, according to one embodiment of this invention;

FIG. 8 is a graph illustrating the thermal-energy properties of the cooling apparatus shown in FIG. 7; and FIG. 9 is a schematic diagram showing a cooling exchanger for use in a heat-actuated compressor according to this invention utilizing the thermosiphon effect.

While it is recognized that the cooling system of my invention may be used to efficiently cool any heat-actuated compressor system, including Stirling engines, further description will be limited to heat-actuated regenerative compressors, it being readily apparent that only slight modifications may be necessary when utilizing another heat-actuated compressor system.

Referring specifically to FIG. 1, the components of a heat-actuated regenerative compressor are shown as outer shell casing 2, insulation 4, and inner shell casing 5, defining gas chamber 6 which is generally cylindrical in shape. Communicating from chamber 6 to external reservoirs are check valved conduits 8 and 10, 8 allowing only for the flow of gas into chamber 6, and 10 allowing only for the flow of gas from chamber 6. Shaft 14 is disposed through chamber 6 and attached to an external power source which causes shaft 14 to undergo an oscillating movement. Secured to shaft 14 is displacer 20 which is semiarcuate in configuration and congruent with inner shell casing 5. Displacer 20 divides chamber 6 into substantially two volumes, a "cold" section 19 and a "hot" section 21. Positioned within chamber 6 from inner shell casing 5 toward the center of the chamber, juxtaposed and extending substantially the entire length of chamber 6, separating cold section 19 from hot section 21 are cooling means 22, heat regenerative means 23, and heating means 24.

Briefly, operation of the compressor is achieved by oscillation of displacer 20 moving gas from cold section 19 through the cooler-regenerator-heater into hot section 21 at an average higher temperature-pressure relationship and then returning the gas from hot section 21 back through the heater-regenerator-cooler to cold section 19 at an average lower temperature-pressure relationship.

The regenerator positioned between the heater and cooler is a thermal storage and exchange unit which in practice is about 85 to 90 percent efficient in overall pick-up-storage-release of thermal energy in response to gasses passing therethrough. Thus, the cooler requirements are reduced to under about 15 percent of the total thermal change. The design and operation of a heat-actuated regenerative compressor as shown in FIG. 1 is further described in copending U.S. Pat. application Ser. No. 698,857, identified above.

The apparatus and process of my invention utilizes a boiling refrigerant cooling media in such a cooler, utilizing a cooler as an evaporator in the cooling cycle. The apparatus and process of my invention results in sizeable reductions in the size of the cooler which, in the case of the heat-actuated regenerative compressor, is necessarily located in the active volume of such compressor, thereby increasing the efficiency of the heat-actuated regenerative compressor. Further, the overall efficiency of the system may be improved due to the large reduction in energy required for movement of the coolant. As explained further herein, for operation of the boiling refrigerant system at constant pressure and relatively constant temperature, pumping requirements can be greatly reduced and even eliminated in such cases.

Boiling refrigerants suitable for use in the apparatus and process of my invention include the various Freons, such as 12, 22 and 502, $SO_2$, $CO_2$, lower aliphatic alcohols, such as methanol and ethanol, and water. The refrigerant should readily vaporize with a 2° to 5° F. change in temperature. Boiling at desired working temperatures is achieved by control of the pressure of the refrigerant. The desired boiling temperature of the cooling fluid depends upon the heat-actuated regenerative compressor utilized, for example, between 100° and 140° F. is suitable when using a heat-actuated regenerative compressor as shown in FIG. 1, and the minimum temperature in the case of the Stirling engine is about 200° F.

One embodiment of my invention is shown schematically in FIG. 2 wherein heat-actuated regenerative compressor 30, such as shown in FIG. 1, is cooled by a boiling refrigerant closed loop cooling system to remove heat from internal cooler 22 thereby cooling the working fluid of the compressor. The liquid refrigerant boils with a temperature change of only a few degrees Fahrenheit and is recondensed by giving up heat to the atmosphere through condenser 25 and the liquid recycled to cooler 22 through the compressor.

Another embodiment of my invention is shown schematically in FIG. 3 wherein a heat-actuated regenerative compressor having a separate boiling refrigerant closed loop cooling system to remove heat from the internal cooler, thereby cooling the working fluid of the compressor, is shown driving an exterior atmosphere cooling cycle. The heat-actuated regenerative compressor may compress the exterior atmosphere cooling refrigerant directly within the working volume of the compressor as is disclosed in said copending applications Ser. No. 542,038, now U.S. Pat. No. 3,400,555, and 547,040, now U.S. Pat. No. 3,413,815, or may compress the external atmosphere cooling refrigerant external to the working volume of the compressor by deriving mechanical energy from the compressor as disclosed in said copending application Ser. No. 698,857, now U.S. Pat. No. 3,474,641. FIG. 3 schematically represents the heat-actuated regenerative compressor 30, such as shown in FIG. 1, powering a condenser-expansion-evaporation-compression exterior atmosphere cooling cycle wherein gas flows from the compressor 30 at $e$ through condenser 31 removing heat from the refrigerant to the atmosphere, flowing from the condenser at $f$ as a liquid, through expansion throttle 32 reducing the pressure to state $g$, and through evaporator 33 wherein heat is taken up from the exterior atmosphere and reentering the heat-actuated regenerative compressor at $h$ for compression. FIG. 4 shows the thermodynamic curves for the cooling system shown in FIG. 3 wherein the power cycle ABCD and cooling cycle $efgh$ are shown in the same temperature-entropy diagram, and states $efgh$ correspond to the locations shown in FIG. 3.

A separate closed cycle boiling refrigerant cooling system is used to cool the internal cooler in the heat-actuated regenerative compressor. In the closed cycle compressor cooling system, as shown in FIG. 3, some heat from the working fluid of the compressor is transferred to the liquid refrigerant through cooler 22 during the CDA portion of the power cycle, the liquid refrigerant boiling as a result of the added heat. The boiling refrigerant is recondensed by giving up heat to the atmosphere through condenser 25, and the liquid recycled to cooler 22 within the compressor. The closed cycle cooling system shown in FIG. 3 is suitable for heat-actuated regenerative compressors having either a mechanical output or those in which the output energy is used directly in a cooling system or heat pump. For the separate closed loop compressor cooling system, I prefer to use the lower alcohols such as ethanol or methanol as the boiling refrigerant, slight pressures of up to 2 atmospheres being necessary to obtain boiling of these alcohols at the desired working temperatures of from about 100° to 140° F. as obtained in heat-actuated compressors such as shown in FIG. 1.

A preferred cooling apparatus according to my invention is a heat-actuated regenerative compressor utilizing a working gas selected from the group consisting of helium, neon, argon, krypton, and xenon, the compressor translating its heat energy output into mechanical energy driving an external atmosphere cooling system, for room cooling, containing a halogenated hydrocarbon refrigerant, such as one of the Freons, having the improvement comprising cooling the internal cooler of the heat-actuated regenerative compressor by a closed cycle evaporation-condensing-cooling - condensing loop containing a boiling refrigerant selected from the group consisting of methanol and ethanol.

In another embodiment of my invention a monorefrigerant cooling system is utilized to cool both the working fluid of a heat-actuated engine, such as heat-actuated regenerative compressor as shown in FIG. 1, and to furnish cooling to an exterior atmospheric environment, such as air-conditioning a room. FIG. 5 schematically shows an apparatus and process for such a monorefrigerant cooling system suitable in instances where the combined thermal coefficient of performance of the heat engine - compressor and cooling system is greater than 1. In FIG. 5, 30 represents a heat-actuated regenerative compressor as shown in FIG. 4, powering a condenser-expansion-evaporation-compression boiling refrigerant cooling cycle wherein gas flows from compressor 30 at state $e$ through condenser 31 removing heat from the refrigerant to the atmosphere, flowing from condenser 31 at state $f$ as a liquid which flow is split, the major portion flowing through cooler 22 within the compressor wherein the refrigerant boils and emerges as a gas at $e'$ and passes through condenser 35 transferring heat to the atmosphere and condensing to liquid at state $f'$, and then joining the minor portion of liquid stream which passed from state $f$ through throttle 36 to reduce the liquid to temperature-pressure conditions of $f'$, passing upon combination through expansion throttle 32 reducing pressure to state $g$, and through evaporator 33 wherein heat is taken up from exterior atmosphere, such as room cooling, thus boiling the refrigerant to state $h$ for reentry to compressor 30 for compression. The proportion of split flow of fluid in state $f$ to pass through throttle 36 to arrive at state $f'$ is proportional to the excess of the overall coefficient of performance greater than 1.

FIG. 6 shows the thermodynamic curves for the cooling system shown in FIG. 5 wherein the power cycle ABCD and the cooling cycle, generally referred to as $efgh$, are shown in the same temperature entropy diagram states as $e$, $e'$, $f$, $f'$, $g$ and $h$ corresponding to the locations shown in FIG. 5. The heat-actuated regenerative compressor output may be converted to mechanical energy and utilized in that fashion for compression of the boiling refrigerant or the compressor may be used directly in the cooling system or heat pump utilizing $CO_2$, $SO_2$ or water as the boiling refrigerant-working fluid. Operation of the heat-actuated regenerative compressor cooling system using $SO_2$ and $CO_2$ is more fully described in said copending application Ser. No. 547,038, now U.S. Pat. No. 3,400,555. When using the heat-actuated regenerative compressor output to compress the boiling refrigerant by translation of the energy to mechanical energy, more fully described in copending application Ser. No. 698,857, now U.S. Pat. No. 3,474,641, Freons, including Freon 12, Freon 22 and Freon 502, are preferred boiling refrigerants. Under such conditions, the operating pressure of the system would be realized at 125° to 140° F. depending upon external atmospheric pressures. However, it is desirable to operate the entire system with minimal temperature changes in order to obtain minimal pressure drop in the overall compressor-cooling system.

Another embodiment of the apparatus and process of my invention is shown schematically in FIG. 7 wherein a heat-actuated regenerative compressor is shown driving a monoboiling-refrigerant cooling system removing heat from both the internal cooler of the compressor and furnishing cooling to the atmosphere, such as a room cooler. This embodiment is suitable for operation of compressor cooling systems having any overall thermal coefficient of performance, including both less than 1 or greater than 1. In FIG. 7, gas flows from heat-actuated regenerative compressor 30 at state $e$ to mixing chamber 38 which is of sufficient capacity to permit general mixing of gases at state $e$ and $e'$, both of which then flow into chamber 38. From mixing chamber 38 the gas flows through condenser 37 exchanging heat to the atmosphere and flows from condenser 37 as a liquid at state $f$. The flow of liquid is split in two portions at state $f'$. One portion flows through cooler 22 located in the working volume of the compressor to cool the working fluid of the compressor. The liquid refrigerant flowing through cooler 22 boils as a result of the heat taken up from the working fluid of the compressor and emerges as a gas at state $3'$ and returns to mixing chamber 38. The flow of refrigerant through cooler 22 is adequate to sufficiently cool the working fluid of compressor 30, and condenser 37 must be of sufficient capacity to condense the gaseous flow of both $e$ and $e'$. The second portion of the flow of liquid at state $f'$ passes through expansion throttle 32 reducing temperature to state $g$, then flows through exterior atmosphere cooler 33, such as a room cooler, boiling the refrigerant to state $h$ for reintroduction into the compression portion of the cycle.

The proportions for the split flow of liquid refrigerant at state $f'$ through throttle 32 and cooler 22 are determined by the overall coefficient of performance. When the coefficient of performance is greater than 1, proportionately more fluid will flow through throttle 32 and hence external atmosphere cooler 33 than through the compressor cooler 22, while conversely when the coefficient of performance is less than 1 more liquid refrigerant will flow through cooling the loop going through compressor cooler 22 than through the atmosphere cooler 33. The portion of fluid passing through cooler 22 remains at condensing pressure and temperature while that portion passing through the atmosphere cooler 33 first passes through throttle 32 to reduce the pressure to evaporator temperature, usually from 40° to 50° F. FIG. 8 shows the thermodynamic curves of the cooling system shown in FIG. 8 wherein the power cycle ABCD and the cooling cycle, generally referred to as $efgh$, are shown as states $e, e', f, f', g$ and $h$ corresponding to the locations shown in FIG. 7.

The apparatus and process described in FIGS. 7 and 8 are suitable both when the heat-actuated regenerative compressor is used directly to compress the boiling refrigerant such as $CO_2$ and $SO_2$, and when the energy output of the compressor is translated into mechanical energy for compression of the boiling refrigerant, as was more fully described above in my reference to copending Pat. application, Ser. No. 547,038.

In either of the monoboiling refrigerant cooling systems as exemplified above in FIGS. 5 and 7, a small pump to drive the refrigerant may be located in the liquid refrigerant stream prior to entry of the liquid into compressor cooler 22. However, in a preferred embodiment of my invention such a pump may be eliminated by design of a heat-actuated regenerative compressor cooler 22 to create a thermosiphon effect providing movement of the refrigerant as a result of the vaporized boiling refrigerant being less dense than the liquid refrigerant rising due to buoyancy in a general vertical tube heat exchanger, serving as cooler 22. FIG. 9 shows apparatus providing the thermosiphon effect which is obtained when passing the boiling refrigerant through generally vertical tubes of cooler 22 within the internal volume of the heat-actuated regenerative compressor. FIG. 9 shows the $e, e', f, f'$ cycle of the cooling unit shown in FIG. 7. Cooler 22 has generally vertical tubes for passage of the refrigerant. Such tubes are suitably arranged and may be finned or employ other means known in the art to further amplify the effect of cooling surfaces. The liquid boiling refrigerant enters at state $f'$ and passes upward through generally vertical tubes 39 absorbing heat from the working volume of the compressor, raising the temperature of the boiling refrigerant 2 to 3° F., thus causing vaporization of the boiling refrigerant at state $e'$. The gas at state $e'$ flows into mixing chamber 38 and then into condenser 37 for recondensation to liquid state $f$. Flow of refrigerant through such a cycle is effectively achieved by the above described thermosiphon effect without the requirement of pump for movement of the refrigerant. Utilizing generally vertical flow tubes in any thermal engine or compressor cooling system will result in satisfactory flow of boiling refrigerant according to any of the described embodiments of the invention.

It is observed from the above specific configurations that the apparatus and process of my invention is an effective boiling refrigerant cooling system for a heat-actuated engine or compressor providing a higher coefficient of performance than has been heretofore obtained. The above described specific embodiments illustrate that the apparatus and process of my invention may be utilized as a separate closed loop cooling system for heat-actuated engines or compressors regardless of the form of output of the engine or compressor. Further, the above described embodiments show the especially highly efficient suitability of my invention for monoboiling refrigerant cooling systems wherein the cooling for a heat-actuated regenerative compressor is part of the same cycle as the exterior atmosphere cooling system, such as room cooling, powered by the compressor. Cooling systems of my invention are suitable for use when the output of a heat-actuated regenerative compressor is translated into mechanical energy for compression of the atmosphere cooling refrigerant, and also suitable when the boiling refrigerant is utilized as a cooling refrigerant and the working fluid of a heat-actuated regenerative compressor.

The boiling refrigerant cooling system of my invention achieves higher heat transfer coefficient than could be achieved with pumped liquids or by convective air cooling. The higher heat transfer coefficients permit use of less heat transfer surface. The reduced heat transfer surface requirement reduces the dead volume portion of the active volume of working fluid in the heat-actuated compressor, thereby increasing the coefficient of performance of the compressor. The large proportion of dead volume of the active volume of working fluid in prior heat-actuated compressors has been one of the principal drawbacks of such prior devices.

The process of my invention for cooling the working fluid of a heat-actuated engine comprises passing a boiling refrigerant through evaporator means in contact with the working fluid of the engine causing vaporization of the boiling refrigerant and then passing the boiling refrigerant through suitable condensing means to condense the boiling refrigerant to the liquid state and returning the liquid refrigerant to the evaporator means. The evaporator means, in the case of a heat-actuated regenerative compressor, is the cooler within the active working volume of the compressor. The term "working fluid" used throughout the specification and claims is meant to include gasses known in the art to be suitable for heat-actuated engines and compressors. A preferred class of working fluids in the case of heat-actuated regenerative compressors includes helium, argon, neon, krypton and xenon. Boiling refrigerants selected from the group consisting of $CO_2$, $SO_2$, and water may also be used as working fluids, particularly when the heat-actuated regenerative compressor is used to directly compress the boiling refrigerant in a cooling process.

The process of my invention also encompasses a cooling process cooling both a heat-actuated compressor and contained exterior atmosphere, such as a room, using a monoboiling refrigerant by compressing the refrigerant using a heat-actuated compressor, passing the compressed refrigerant through a first condenser to condense the refrigerant to a liquid state, dividing the output from the first condenser into a major and minor portion directly proportional to the coefficient of performance greater than 1, passing the major portion through a cooler thermal exchanger cooling the active volume of the heat-actuated compressor causing vaporization of the refrigerant and then passing the output of the cooler through a second condenser to condense the refrigerant to a liquid state, passing the minor portion through a minor expansion means, such as a throttle, to reduce the pressure to that of the output of the second condenser, recombining the portions and passing the combined portions through a major expansion means, such as a throttle or engine, reducing the temperature to evaporator condition, then passing the liquid refrigerant through a cooler evaporator thereby cooling the contained exterior atmosphere causing vaporization of the refrigerant, and returning the vaporized refrigerant to the compressor for recompression. This process may be utilized wherein the compressor output is translated into mechanical energy to compress the refrigerant or wherein the compressor directly compresses the refrigerant in which case the refrigerant is also the working fluid of the heat-actuated compressor. In the latter instance, $CO_2$, $SO_2$, and water are suitable refrigerants.

The process of my invention also encompasses a cooling process cooling both a heat-actuated compressor and contained exterior atmosphere, such as a room, using a monoboiling refrigerant by compressing the refrigerant using a heat-actuated compressor, passing the compressed refrigerant into a mixing chamber, passing the output of the mixing chamber through a condenser condensing the refrigerant to the liquid state, dividing the output of the condenser into a first portion and a second portion and passing the first portion through a cooler thermal exchanger cooling the active volume of the compressor causing vaporization of the refrigerant and passing the output from the cooler into the mixing chamber, passing the second portion through an expansion means, such as a throttle or engine reducing the temperature to evaporator condition, then passing the liquid refrigerant through a cooler evaporator thereby cooling the contained atmosphere causing vaporization of the refrigerant, and returning the refrigerant vapor to the compressor for recompression. This process may be utilized wherein the compressor output is translated into mechanical energy to compress the refrigerant or wherein the compressor directly compresses the refrigerant in which case the refrigerant is also the working fluid of the heat-actuated compressor. In the latter instance, $CO_2$, $SO_2$, and water are suitable refrigerants.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A cooling apparatus containing a monoboiling refrigerant comprising a heat-actuated compressor to compress said refrigerant having a first volume at a higher average temperature-pressure relationship and a second volume at a lower average temperature-pressure relationship, heating means, regenerative means and a cooler thermal exchanger respectively separating said volumes, a first condenser in conduit relation with the compressed refrigerant output of said compressor, said cooler in conduit relation with a major portion of the output of said first condenser, a second condenser in conduit relation with the output of said cooler, a minor expansion means in conduit relation with the remainder portion of the output of said first condenser, a major expansion means in conduit relation with the output of said minor expansion means in conduit relation with the output of said minor expansion means and said second condenser, and exterior atmosphere cooling-evaporation means in conduit relation with the output of said major expansion means and in conduit relation with the input of said compressor.

2. The apparatus of claim 1 wherein said compressor mechanically compresses said refrigerant selected from the group consisting of Freon 12, Freon 22, Freon 502, methanol and ethanol.

3. The apparatus of claim 1 wherein said cooler is within the active volume of said compressor.

4. The apparatus of claim 1 wherein said cooler comprises generally vertical passages to create a thermosiphon for movement of said boiling refrigerant through said apparatus.

5. The apparatus of claim 1 wherein said boiling refrigerant is the working fluid of said heat-actuated compressor and is selected from the group consisting of $CO_2$, $SO_2$, and water.

6. A cooling apparatus containing a monoboiling refrigerant comprising a heat-actuated compressor to compress said refrigerant having a first volume at a higher average temperature-pressure relationship and a second volume at a lower average temperature-pressure relationship, heating means, regenerative means and a cooler thermal exchanger respectively separating said volumes, a mixing chamber in conduit relation with the compressed refrigerant output of said compressor, a condenser in conduit relation with said chamber, said cooler in conduit relation with a portion of the output of said condenser and in conduit relation with said chamber forming a loop with said chamber, condenser, and cooler, expansion means in conduit relation with the remainder portion of the output of said condenser, and exterior atmosphere cooling-evaporation means in conduit relation with the output of said expansion means and in conduit relation with the input of said compressor.

7. The apparatus of claim 6 wherein said compressor mechanically compresses said refrigerant selected from the group consisting of Freon 12, Freon 22, Freon 502, methanol and ethanol.

8. The apparatus of claim 6 wherein said cooler is within the active volume of said compressor.

9. The apparatus of claim 6 wherein said cooler comprises generally vertical passages to create a thermosiphon for movement of said boiling refrigerant through said apparatus.

10. The apparatus of claim 6 wherein said boiling refrigerant is the working fluid of said heat-actuated compressor and is selected from the group consisting of $CO_2$, $SO_2$, and water.

11. A process for cooling a heat-actuated compressor and contained exterior atmosphere using a monoboiling refrigerant comprising the steps of compressing said refrigerant with a heat-actuated compressor, passing said compressed refrigerant through a first condenser condensing said refrigerant to the liquid state, dividing the output of said first condenser into a major portion and a minor portion said minor portion being directly proportional to the coefficient of performance greater than 1, passing said major portion through a cooler thermal exchanger cooling the active volume of the heat-actuated compressor causing vaporization of the refrigerant and then through a second condenser to condense the refrigerant to a liquid state, passing said minor portion through a minor expansion means to reduce the pressure to that of said major portion output of said second condenser, recombining said major and minor portions, passing said combined portions through a major expansion means reducing the temperature to evaporator condition, then passing the liquid refrigerant through cooling-evaporation means cooling contained exterior atmosphere causing vaporization of the refrigerant, and returning said vaporized refrigerant to said compressor for recompression.

12. The process of claim 11 wherein said compressor mechanically compresses said refrigerant selected from the group consisting of Freon 12, Freon 22, Freon 502, methanol and ethanol.

13. The process of claim 11 wherein said boiling refrigerant is the working fluid of said heat-actuated compressor and is selected from the group consisting of $CO_2$, $SO_2$, and water.

14. The process of claim 11 wherein said major portion is passed through a cooler thermal exchanger within the working volume of said heat-actuated compressor.

15. A process for cooling a heat-actuated compressor and contained exterior atmosphere using a monoboiling refrigerant comprising the steps of compressing said refrigerant with a heat-actuated compressor, passing said compressed refrigerant into a mixing chamber, passing the output of said mixing chamber through a condenser condensing said refrigerant to the liquid state, dividing the output of said condenser into a first portion and a second portion said first portion passing through a cooler thermal exchanger cooling the active volume of the heat-actuated compressor causing vaporization of the refrigerant and passing the output of said cooler into said chamber, passing said second portion through an expansion means reducing the temperature to evaporator condition, then passing the liquid refrigerant through cooling-evaporation means cooling contained exterior atmosphere causing vaporization of the refrigerant, and returning said vaporized refrigerant to said compressor for recompression.

16. The process of claim 15 wherein said compressor mechanically compresses said refrigerant selected from the group consisting of Freon 12, Freon 22, Freon 502, methanol and ethanol.

17. The process of claim 15 wherein said boiling refrigerant is the working fluid of said heat-actuated compressor and is selected from the group consisting of $CO_2$, $SO_2$, and water.

18. The process of claim 15 wherein said first portion is passed through a cooler thermal exchanger within the working volume of said heat-actuated compressor.